United States Patent
Mizuta et al.

(10) Patent No.: US 10,109,891 B2
(45) Date of Patent: Oct. 23, 2018

(54) LITHIUM BATTERY

(71) Applicant: Panasonic Intellectual Property Management Co., Ltd., Osaka (JP)

(72) Inventors: Touta Mizuta, Osaka (JP); Shinichi Kawaguchi, Osaka (JP); Takao Uyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/025,485

(22) PCT Filed: Oct. 21, 2014

(86) PCT No.: PCT/JP2014/005326
§ 371 (c)(1),
(2) Date: Mar. 28, 2016

(87) PCT Pub. No.: WO2015/064052
PCT Pub. Date: May 7, 2015

(65) Prior Publication Data
US 2016/0218399 A1     Jul. 28, 2016

(30) Foreign Application Priority Data
Oct. 31, 2013    (JP) .................. 2013-226832

(51) Int. Cl.
*H01M 6/00*    (2006.01)
*H01M 10/42*   (2006.01)
(Continued)

(52) U.S. Cl.
CPC ....... *H01M 10/4235* (2013.01); *H01M 4/364* (2013.01); *H01M 4/366* (2013.01);
(Continued)

(58) Field of Classification Search
CPC ...................................................... H01M 6/00
See application file for complete search history.

(56) References Cited

U.S. PATENT DOCUMENTS

2003/0152839 A1    8/2003    Kawai et al.
2006/0115728 A1    6/2006    Kawai et al.
(Continued)

FOREIGN PATENT DOCUMENTS

EP    1498979 A1    1/2005
JP    2004-047413 A    2/2004
(Continued)

OTHER PUBLICATIONS

Extended European Search Report issued in the corresponding European Patent Application No. 14 858 927.8, dated Jul. 22, 2016.
International Search Report issued in Application No. PCT/JP2014/005326 dated Dec. 2, 2014, with English translation.

*Primary Examiner* — Jacob B Marks
(74) *Attorney, Agent, or Firm* — McDermott Will & Emery LLP

(57) ABSTRACT

A lithium battery including a positive electrode, a negative electrode containing lithium, and a non-aqueous electrolyte having lithium ion conductivity. The positive electrode includes at least one of a manganese oxide and a fluorinated graphite. A powdery or fibrous carbon material adheres to at least part of a surface of the negative electrode, the surface facing the positive electrode. The non-aqueous electrolyte includes a non-aqueous solvent, a solute, and an additive. The solute includes $LiClO_4$, and the additive is $LiBF_4$. The ratio of $LiBF_4$ is, for example, 1 to 100 parts by mass, relative to 100 parts by mass of the solute.

5 Claims, 2 Drawing Sheets

(51) Int. Cl.
*H01M 10/052* (2010.01)
*H01M 10/0567* (2010.01)
*H01M 10/0568* (2010.01)
*H01M 4/36* (2006.01)
*H01M 4/58* (2010.01)
*H01M 4/583* (2010.01)
*H01M 4/587* (2010.01)
*H01M 4/50* (2010.01)
*H01M 10/0525* (2010.01)
*H01M 10/0569* (2010.01)
*H01M 4/02* (2006.01)

(52) U.S. Cl.
CPC ............ *H01M 4/50* (2013.01); *H01M 4/502* (2013.01); *H01M 4/582* (2013.01); *H01M 4/587* (2013.01); *H01M 4/5835* (2013.01); *H01M 10/052* (2013.01); *H01M 10/0525* (2013.01); *H01M 10/0567* (2013.01); *H01M 10/0568* (2013.01); *H01M 10/0569* (2013.01); *H01M 2004/025* (2013.01); *H01M 2220/30* (2013.01)

(56) References Cited

U.S. PATENT DOCUMENTS

| | | | |
|---|---|---|---|
| 2006/0127778 A1 | 6/2006 | Kawai et al. | |
| 2006/0194111 A1 | 8/2006 | Ooga et al. | |
| 2009/0263722 A1* | 10/2009 | Sano | H01M 4/06 429/231.95 |
| 2011/0070484 A1 | 3/2011 | Sand | |
| 2013/0330609 A1* | 12/2013 | Sawa | H01M 4/587 429/200 |

FOREIGN PATENT DOCUMENTS

| | | |
|---|---|---|
| JP | 2005-216867 A | 8/2005 |
| JP | 2006-024575 A | 1/2006 |
| JP | 2007-273396 A | 10/2007 |
| JP | 2009-140648 A | 6/2009 |
| JP | 2009-252731 A | 10/2009 |
| JP | 2010-262864 A | 11/2010 |
| JP | 2011-091034 A | 5/2011 |

* cited by examiner

LITHIUM BATTERY

RELATED APPLICATIONS

This application is the U.S. National Phase under 35 U.S.C. § 371 of International Application No. PCT/JP2014/005326, filed on Oct. 21, 2014, which in turn claims the benefit of Japanese Application No. 2013-226832, filed on Oct. 31, 2013, the disclosures of which are incorporated by reference herein.

TECHNICAL FIELD

The present invention relates to a lithium battery, specifically to a lithium battery excellent in both high-temperature storage characteristics and pulse discharge characteristics.

BACKGROUND ART

Electronic devices powered by lithium batteries have been more and more widely applied in various fields, and in association therewith, the operating temperature range of the electronic devices tends to be wider. For example, it is required for a lithium battery used in a vehicle-mounted electronic device such as a tire pressure sensor to be able to function over a certain period of time at a high temperature of 100° C. or more, as well as to operate even at a low temperature of −40° C.

A promising candidate as a lithium battery having a wide operating temperature range is a lithium battery that includes manganese oxide and/or fluorinated graphite in the positive electrode and metal lithium and/or lithium alloy in the negative electrode.

However, in the above configuration, in a high temperature environment, the non-aqueous electrolyte reacts with the positive electrode and decomposes to generate gas. Such gas generation is dominant, particularly when the positive electrode includes manganese oxide. The gas generation may cause electrolyte leakage or rupture of the battery, which may damage the electronic device. To suppress the gas generation, Patent Literature 1 proposes to reform the manganese oxide and add an additive in the non-aqueous electrolyte.

In a lithium battery including metal lithium and/or lithium alloy in the negative electrode, polarization tends to increase in the early stage of discharge, and particularly when discharged at a large current in a low temperature environment, voltage tends to drop severely. To suppress the voltage drop, Patent Literature 2 proposes to allow a powdery carbon material to adhere to the surface of the negative electrode.

CITATION LIST

Patent Literature

[PTL 1] Japanese Laid-Open Patent Publication No. 2010-262864
[PTL 2] Japanese Laid-Open Patent Publication No. 2009-140648

SUMMARY OF INVENTION

Technical Problem

According to Patent Literature 1, since the additive forms a surface film on the positive electrode and/or the negative electrode, the gas generation during high-temperature storage of the battery can be suppressed. Moreover, as a result, the inter-component contact can be maintained, and the increase in internal pressure can be suppressed. However, the surface film derived from the additive serves also as a resistive component, making it sometimes difficult to maintain the pulse discharge characteristics.

According to Patent Literature 2, since the side reaction that causes polarization is suppressed, the voltage drop during discharge can be suppressed to some extent. However, there is no known technique enabling to suppress the gas generation associated with side reactions during high-temperature storage of the battery, as well as to favorably maintain the pulse discharge characteristics in a low temperature environment after storage.

Solution to Problem

One aspect of the present invention relates to a lithium battery including a positive electrode, a negative electrode containing lithium, and a non-aqueous electrolyte having lithium ion conductivity. The positive electrode includes at least one of a manganese oxide and a fluorinated graphite. A powdery or fibrous carbon material adheres to at least part of a surface of the negative electrode, the surface facing the positive electrode. The non-aqueous electrolyte includes a non-aqueous solvent, a solute, and an additive. The solute includes $LiClO_4$, and the additive is $LiBF_4$.

Advantageous Effects of Invention

According to the present invention, it is possible to provide a lithium battery capable of suppressing the gas generation during high temperature storage and maintaining the pulse discharge characteristics favorably in a low temperature environment after storage.

DESCRIPTION OF EMBODIMENTS

Figure 1:
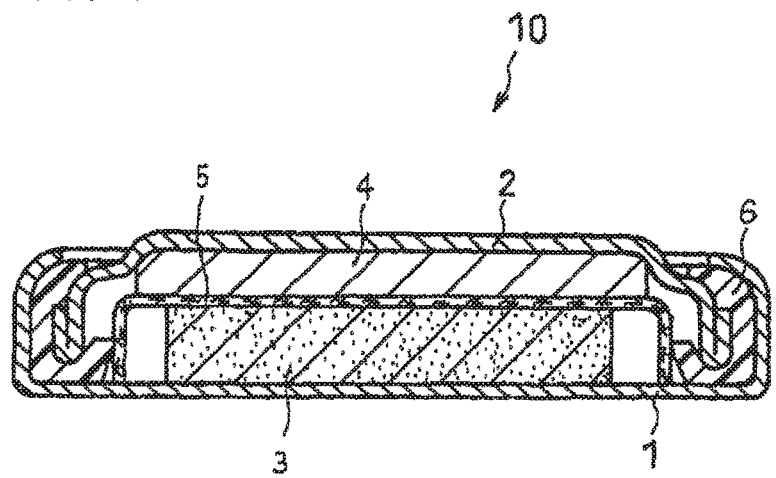
FIG. 1 A cross-sectional view of an example of a coin lithium battery according to one embodiment of the present invention.

A lithium battery according to the present invention includes a positive electrode, a negative electrode containing lithium, and a non-aqueous electrolyte having lithium ion conductivity. The positive electrode includes at least one of a manganese oxide and a fluorinated graphite. A powdery or fibrous carbon material adheres to at least part of a surface of the negative electrode, the surface facing the positive electrode. The non-aqueous electrolyte includes a non-aqueous solvent, a solute, and an additive. The solute includes LiClO$_4$, and the additive is LiBF$_4$. The non-aqueous electrolyte preferably contains LiClO$_4$ in a proportion of 0.2 to 2 mol/L. The non-aqueous electrolyte preferably contains LiBF$_4$ in a proportion of 0.1 to 5 mass %, more preferably 1 to 5 mass %.

By allowing a powdery or fibrous carbon material to adhere to at least part of the surface of the negative electrode facing the positive electrode, the formation of a resistance component derived from LiBF$_4$ included as the additive can be significantly suppressed. On the other hand, the effect of suppressing the gas generation due to LiBF$_4$ is not inhibited, and no malfunction due to gas generation is likely to occur even after the battery is stored for a comparatively long time in a high temperature environment. Therefore, the lithium battery configured as above shows significant improvement in pulse discharge characteristics in a low temperature environment after high temperature storage.

It is noted that, even if an additive is not included in the non-aqueous electrolyte, the pulse discharge characteristics can be improved by allowing a carbon material to adhere to at least part of the surface of the negative electrode facing positive electrode. However, without the additive, the battery deteriorates significantly when stored at a high temperature (e.g., 105° C.) for a long time (e.g., 1000 hours). The battery deterioration is mainly caused by a depletion of non-aqueous electrolyte due to decomposition reactions, an increase in internal resistance, and others.

Even if a carbon material is not allowed to adhere to the surface of the negative electrode facing the positive electrode, the gas generation during storage in a high temperature environment can be suppressed by using an additive. However, without the carbon material, the battery internal resistance after storage may increase significantly. Consequently, storage and operation in a high temperature environment become difficult in many cases.

By allowing a carbon material to adhere to at least part of the surface of the negative electrode facing the positive electrode, and adding an appropriate amount (e.g., 0.1 to 5 mass %) of LiBF$_4$ in the non-aqueous electrolyte, even the battery which has teen stored at 105° C. for 1000 hours shows little deterioration as above, or deterioration is suppressed. Moreover, excellent pulse discharge characteristics are exhibited even in a low temperature environment (e.g., −40° C.). The above synergetic effect is outstanding when storing the battery at a high temperature of 100° C. or more, or even as high as about 125° C.

The amount of the carbon material allowed to adhere to the surface of the negative electrode facing the positive electrode is preferably 0.02 mg/cm$^2$ to 10.0 mg/cm$^2$. This enhances the effect of suppressing the formation of a resistance component on the negative electrode surface, making it easy to ensure good electronic conductivity on the negative electrode surface.

The carbon material may be combined with a sheet porous matrix material. In this case, the matrix material adheres together with the carbon material to the surface of the negative electrode facing the positive electrode. This simplifies the process of allowing a carbon material to adhere to the negative electrode surface. Therefore, in battery fabrication, the carbon material is unlikely to scatter around or disperse into the non-aqueous electrolyte.

The ratio of LiBF$_4$ serving as the additive is preferably 1 to 100 party by mass, more preferably 10 to 100 parts by mass, relative to 100 parts by mass of the solute included in the non-aqueous electrolyte. This makes it possible to optimize the consumption of LiBF$_4$ within the battery, and delay the increase in the battery internal resistance.

The non-aqueous solvent preferably includes a cyclic carbonic acid ester and a chain ether. The cyclic carbonic acid ester preferably includes propylene carbonate. The chain ether preferably includes dimethoxyethane. In this case, the non-aqueous electrolyte preferably contains propylene carbonate and dimethoxyethane in a proportion of 40 to 98 mass % in total. The non-aqueous solvent as above is excellent as it shows electrochemical stability and high conductivity over a wide temperature range from low to high temperatures.

In one embodiment of the present invention, the positive electrode and the negative electrode are both in disc shape. Examples of a lithium battery including the positive electrode and the negative electrode as above include a coin battery and a button battery. The lithium battery having the above configuration is suitable as a primary battery.

A detailed description is given below of embodiments of the present invention.

A lithium battery according to an embodiment of the present invention includes a positive electrode, a negative electrode disposed opposite to the positive electrode, and a non-aqueous electrolyte having lithium ion conductivity. The positive electrode and the negative electrode are preferably arranged with a separator made of a porous material capable of retaining the non-aqueous electrolyte interposed therebetween.

The positive electrode can be obtained by, for example, compacting a positive electrode material mixture, i.e., a mixture of a positive electrode active material, a conductive material and a binder, into a disc shape. Alternatively, the positive electrode can be obtained by allowing a positive electrode material mixture to be retained on a positive electrode current collector. Examples of the positive electrode current collector include stainless steel, aluminum and titanium. For example, the positive electrode material mixture is mixed with a liquid component to form a slurry, and the slurry is applied onto a surface of the positive electrode current collector and then dried, thereby the positive electrode material mixture can be retained on the positive electrode current collector.

The positive electrode active material includes at least one of a manganese oxide and a fluorinated graphite. One positive electrode active material may be used singly or two or more may be used in combination. A battery including manganese oxide as the positive electrode active material has a comparatively high voltage and is excellent in pulse discharge characteristics. A battery including fluorinated graphite as the positive electrode active material is excellent in high-temperature storage characteristics and long-term reliability.

The manganese in the manganese oxide typically has an oxidation number of 4. The oxidation number is not limited to 4, and may be somewhat higher or lower than this. The manganese oxide that can be used includes MnO, Mn$_3$O$_4$, Mn$_2$O$_3$, MnO$_2$, and MnO$_3$. Typically, a manganese oxide mainly composed of manganese dioxide is used. The manganese oxide may be in a mixed crystalline state including two or more crystalline states.

The manganese oxide preferably has a specific surface area of, for example, 0.5 to 7 m$^2$/g. By setting the specific surface area of the manganese oxide within the range above, the discharge reaction site can be sufficiently ensured easily, and the effect of suppressing the decomposition reactions of the non-aqueous electrolyte can be enhanced. This is effective in ensuring the storage characteristics as well as the pulse discharge characteristics. The specific surface area of the manganese oxide is preferably 0.5 to 6 m²/g, more preferably 3 to 6 m²/g.

The fluorinated graphite is a compound represented by the general formula: $CF_x$, where $0.9 \leq x \leq 1.1$. The fluorinated graphite can be obtained by fluorinating, for example, petroleum coke or artificial graphite.

The conductive material that can be used includes natural graphite, artificial graphite, carbon black, and carbon fiber. Examples of carbon black include acetylene black, Ketjen black, channel black, furnace black, lamp black, and thermal black. One of these may be used singly or two or more may be used in combination. The amount of the conductive material contained in the positive electrode material mixture is, for example, 5 to 30 parts by mass per 100 parts by mass of the positive electrode active material.

The binder that can be used includes: olefinic resins, such as polyethylene and polypropylene; fluorocarbon resins, such as polytetrafluoroethylene (PTFE), polyvinylidene fluoride, tetrafluoroethylene-hexafluoropropylene copolymer, and vinylidene fluoride-hexafluoropropylene copolymer; styrene-butadiene rubbers; fluorocarbon rubbers; and poly(meth)acrylic acid. One of these may be used singly or two or more may be used in combination. The amount of the binder contained in the positive electrode material mixture is, for example, 3 to 15 parts by mass per 100 parts by mass of the positive electrode active material.

The negative electrode includes at least one of metal lithium and lithium alloy. The lithium alloy is an alloy containing element M other than lithium. Element M preferably includes at least one selected from the group consisting of Mg, Al, Ca, Ti, V, Cr, Mn, Fe, Co, Ni, Cu and Zn. The content of element M in the lithium alloy is preferably 20% or less in element ratio. The negative electrode can be obtained by, for example, cutting a metal lithium or lithium alloy sheet into a disc shape. The negative electrode may be allowed to adhere to a negative electrode current collector. For example, copper, nickel or stainless steel may be used as the negative electrode current collector.

A powdery or fibrous carbon material adheres to at least part of the surface of the negative electrode facing the positive electrode. This can reduce the side reactions between the negative electrode surface and the non-aqueous electrolyte (specifically, the side reaction between the negative electrode surface and $LiBF_4$). In particular, when the positive electrode includes fluorinated graphite, important to suppress the formation of an electrically-insulative LiF surface film on the negative electrode.

The amount of the carbon material allowed to adhere to the negative electrode surface is preferably 0.02 mg/cm² to 10.0 mg/cm². When the amount of the carbon material existing per unit area of the negative electrode surface facing the positive electrode is within the above range, the surface film formation can be considerably suppressed, making it easy to ensure good electronic conductivity on the negative electrode surface.

The area to be covered with the carbon material is not particularly limited, but is, for example, 1 to 100%, preferably 30 to 100%, more preferably 80 to 100% of the area of the negative electrode surface facing the positive electrode. The higher the proportion of the area covered with the carbon material is, the more effectively the pulse discharge characteristics can be maintained. Distinction between the surface covered with the carbon material and that not covered can be made by taking an image of the negative electrode surf facing the positive electrode and binarizing the image.

The carbon material may be retained in a sheet of porous matrix material in advance and arranged together with the matrix material on the negative electrode surface. This is an optional method to allow a carbon material to adhere to the negative electrode surface. By allowing a carbon material to be retained uniformly in a thin matrix material, the carbon material can adhere in a favorable state to the negative electrode surface. Since the carbon material is retained in the matrix material, in battery fabrication, the carbon material is unlikely to scatter around or disperse into the non-aqueous electrolyte during injection of the non-aqueous electrolyte.

To maintain the ion conductivity of the negative electrode surface, the matrix material is preferably a fiber material. The fiber material is preferably a nonwoven fabric. A preferable material of the nonwoven fabric is, for example, polypropylene or polyphenylene sulfide. The nonwoven fabric preferably has a basis weight of 20 g/m² to 60 g/m² and a thickness of 0.08 mm to 0.50 mm. The nonwoven fabric retaining a carbon material can be obtained by, for example, applying an alcohol dispersion including a carbon material to a nonwoven fabric or impregnating the nonwoven fabric with the dispersion, followed by drying.

Examples of the powdery or fibrous carbon material allowed to adhere to the negative electrode surface include natural graphite, artificial graphite, hard carbon, soft carbon, carbon black, carbon fiber, and carbon nanotube. Examples of carbon black includes acetylene black, Ketjen black, channel black, furnace black, lamp black, and thermal black. One carbon material may be used singly or two or more may be used in combination. Most preferred among them is carbon black, and the particle size thereof is preferably 5 nm to 8 µm.

The non-aqueous electrolyte includes a non-aqueous solvent, a solute, and an additive. The solute includes $LiClO_4$, and the additive is $LiBF_4$. Preferably, the non-aqueous electrolyte includes $LiClO_4$ in a proportion of 0.2 to 2 mol/L. Preferably, the non-aqueous electrolyte includes $LiBF_4$ in a proportion of 0.1 to 5 mass %. More preferably, the non-aqueous electrolyte includes $LiClO_4$ in a proportion of 0.3 to 1.5 mol/L, particularly preferably 0.4 to 1.2 mol/L. More preferably, the non-aqueous electrolyte includes $LiBF_4$ in a proportion of 1 to 5 mass %.

Examples of the non-aqueous solvent include: chain carbonic acid esters, such as dimethyl carbonate (DMC), diethyl carbonate (DEC), and ethylmethyl carbonate (EMC); cyclic carbonic acid esters, such as ethylene carbonate (EC), propylene carbonate (PC), and butylene carbonate; chain ethers, such as 1,2-dimethoxyethane (DME), 1,2-diethoxyethane (DEE), and ethoxymethoxyethane EME; cyclic ethers, such as tetrahydrofuran, 2-methyltetrahydrofuran, 1,3-dioxolane, and 4-methyl-1,3-dioxolane; and cyclic carbonic acid esters, such as γ-butyrolactone. One of these may be used singly or two or more may be used in combination.

The non-aqueous solvent preferably includes a cyclic carbonic acid ester, which has a high boiling point, and a chain ether, which has a low viscosity even at low temperatures. Among cyclic carbonic acid esters, PC is preferable. Among chain ethers, DME is preferable. PC and DME are preferably mixed in a PC/DME volume ratio of 20/80 to 80/20, more preferably 40/60 to 60/40.

When the non-aqueous electrolyte includes PC and DME, the non-aqueous electrolyte preferably includes PC and DME in a proportion of 40 to 98 mass % in total, more preferably 70 to 97, mass % particularly preferably 70 to 90 mass %.

The solute (lithium salt) in the non-aqueous electrolyte includes at least $LiClO_4$. The inclusion of $LiClO_4$ can provide a non-aqueous electrolyte having a high dielectric constant and a high conductivity. Furthermore, $LiClO_4$ has good affinity for cyclic carbonic acid esters and chain ethers.

The solute can include $LiClO_4$ and other lithium salts such as $LiPF_6$, $LiR^1SO_3$, where $R^1$ is a C1-C4 fluorinated alkyl group, and $LiN(SO_2R^2)(SO_2R^3)$, where $R^2$ and $R^3$ are independently a C1-C4 fluorinated alkyl group. One of these other salts may be used singly or two or more may be used in combination. The total concentration of the solute in the non-aqueous electrolyte is preferably 0.2 to 2.0 mol/L, more preferably 0.3 to 1.5 mol/L, particularly preferably 0.4 to 1.2 mol/L, it should be noted that preferably 50 mass % or more, more preferably 80 mass % or more of the solute comprises $LiClO_4$.

In the lithium salt (sulfonate) represented by $LiR^1SO_3$, the C1-C4 fluorinated alkyl group represented by $R^1$ is preferably a C1-C4 perfluoroalkyl group, for example, perfluoromethyl, perfluoroethyl, perfluoropropyl, or perfluorobutyl. In the lithium salt (imide salt) represented by $LiN(SO_2R^2)(SO_2R^3)$, the C1-C4 fluorinated alkyl group represented by $R^2$ and $R^3$ is preferably a C1-C4 perfluoroalkyl group, for example, perfluoromethyl, perfluoroethyl, perfluoropropyl, or perfluorobutyl.

The non-aqueous electrolyte contains $LiBF_4$ as the additive in a proportion of, for example, 0.1 to 5 mass %. Particularly in a high temperature environment, $LiBF_4$ forms a surface film on the positive electrode, thereby to reduce the decomposition of the non-aqueous electrolyte. The larger the amount of $LiBF_4$ is, the less likely the gas generation occurs in a high temperature environment. However, when the amount of $LiBF_4$ is too large, the battery internal resistance may increase, and the pulse discharge characteristics may deteriorate. Therefore, the amount of $LiBF_4$ is preferably 0.1 to 5 mass %, more preferably 1 to 5 mass %, particularly preferably 2 to 5 mass % or 2 to 4 mass %, relative to the total amount of the non-aqueous electrolyte.

The ratio of $LiBF_4$ is preferably 1 to 100 parts by mass, relative to 100 parts by mass of the solute. The ratio of $LiBF_4$ relative to 100 parts by mass of $LiClO_4$ is preferably 1 to 100 parts by mass, more preferably 2 to 90 parts by mass, further more preferably 10 to 80 parts by mass, particularly preferably 20 to 70 parts by mass. This makes the conductivity of the non-aqueous electrolyte more favorable. Furthermore, this can more effectively suppress the increase in battery internal resistance and the battery swelling due to gas generation during storage at high temperatures.

In a preferable embodiment of the non-aqueous electrolyte, for example, the non-aqueous solvent is a mixed solvent of PC and DME having a PC/DME volume ratio of 40/60 to 60/40, 90 mass % or more of the solute is $LiClO_4$, and the concentration of the solute is 0.3 to 1.0 mol/L. In this embodiment, the amount of $LiBF_4$ contained in the non-aqueous electrolyte is preferably 20 to 70 parts by mass, relative to 100 parts by mass of $LiClO_4$.

FIG. 1 is a cross-sectional view of an example of a coin lithium battery according to one embodiment of the present invention. It should be noted, however, that the shape of the lithium battery is not limited thereto, and may be any shape such as cylindrical, prismatic, sheet, flat, laminate and button.

A lithium battery 10 includes a positive electrode 3, a negative electrode 4, a separator 5 interposed between the positive electrode 3 and the negative electrode 4, and a non-aqueous electrolyte (not shown). The positive electrode 3 is accommodated in a battery case 1 serving as a positive terminal, and the negative electrode 4 is bonded on the inside surface of a sealing plate 2 serving as a negative terminal. The opening of the battery case 1 is closed with the sealing plate 2. The sealing plate 2 is provided at its periphery with an injection-molded annular gasket 6. The opening end of the battery case 1 is crimped inward so that the gasket 6 is pressed against the sealing plate 2, thereby the battery is sealed.

The separator 5 is, example, a non-woven fabric or microporous film. Examples of the material of the non-woven fabric or microporous film include polyphenylene sulfide (PPS), polyethylene, polypropylene, a mixture of polyethylene and polypropylene, and a copolymer of ethylene and propylene.

The present invention will be more specifically described below with reference to Examples.

Example 1

(1) Production of Positive Electrode

To 100 parts by mass of manganese dioxide, 50 parts by mass of Ketjen black serving as an electrically conductive material and 5 parts by mass of polytetrafluoroethylene (PTFE) serving as a binder were added and well mixed together, to prepare a positive electrode material mixture. The positive electrode material mixture was compacted into a disc shape of 15 mm in diameter and 3.0 mm in thickness, and then dried at 200° C. Thereby, a positive electrode was produced.

(2) Production of Negative Electrode

A 1.0-mm-thick metal lithium sheet was out into a disc shape of 16 mm in diameter, which was used as a negative electrode.

On the other hand, acetylene black (average particle size of primary particles: 35 nm) as a carbon material was well mixed with water and ethanol, to prepare a dispersion. The dispersion was sprayed and applied onto one surface of a 0.25-mm-thick polyphenylene sulfide (PPS) nonwoven fabric (basis weight: 25, $g/m^2$) serving as a matrix material, and dried at 50° C. for 6 hours. The amount of carbon material retained on the matrix material (i.e., the amount of carbon material allowed to adhere to the negative electrode surface) was 0.1 $mg/cm^2$. A carbon material/matrix material composite thus obtained was cut into a disc shape of 15 mm in diameter.

(3) Preparation of Non-Aqueous Electrolyte

Propylene carbonate (PC) and 1,2-dimethoxyethane (DME) were mixed in a volume ratio of 1:1 to prepare a non-aqueous solvent. The non-aqueous solvent was used to prepare a non-aqueous electrolyte containing $LiClO_4$ as a solute in proportion of 0.5 mol/L and $LiBF_4$ in a proportion of 2.0 mass %. The solute was composed of $LiClO_4$ only. The ratio of $LiBF_4$ relative to 100 parts by mass of the solute ($LiClO_4$) was about 42.0 parts by mass.

(4) Fabrication of Coin Lithium Battery

A bottom-closed battery case made of stainless steel (positive terminal) having an opening was prepared. The positive electrode and a separator were placed in this order from the bottom within the battery case. The separator used here was a 0.45-mm-thick polyphenylene sulfide (PPS) nonwoven fabric. On the other hand, a sealing plate made of stainless steel (negative terminal) provided with a PPS gasket around the periphery was prepared. The negative electrode was bonded on the inside surface of the sealing plate, and further, the disc-shaped carbon material/matrix material composite was bonded on the surface of the negative electrode (the surface facing the positive electrode). The non-aqueous electrolyte was injected into the battery case to bring the positive electrode and the separator into contact with the non-aqueous electrolyte. Thereafter, the opening of the battery case was closed with the sealing plate, and the opening end of the battery case was crimped onto the periphery of the sealing plate. In this manner, a coin lithium battery (Battery A1) as illustrated in FIG. 1 was obtained.

Comparative Example 1

A coin lithium battery (Battery B) was fabricated in the same manner as Battery A1, except that $LiBF_4$ was not added in the non-aqueous electrolyte.

Comparative Example 2

A coin lithium battery (Battery C) was fabricated in the same manner as Battery A1, except that $LiBF_4$ was not added in the non-aqueous electrolyte, and the carbon material/matrix material composite was not bonded on the surface of the negative electrode (the surface facing the positive electrode).

Example 2

A coin lithium battery (Battery A2) was fabricated in the same manner as Battery A1, except that the proportion of $LiBF_4$ in the non-aqueous electrolyte was changed to 1.0 mass %.

Example 3

A coin lithium battery (Battery A3) was fabricated in the same manner as Battery A1, except that the proportion of $LiBF_4$ in the non-aqueous electrolyte was changed to 3.0 mass %.

Example 4

A coin lithium battery (Battery A4) was fabricated in the same manner as Battery A1, except that the proportion of $LiBF_1$ in the non-aqueous electrolyte was changed to 4.0 mass %.

Example 5

A coin lithium battery (Battery A5) was fabricated in the same manner as Battery A1, except that the proportion of $LiBF_4$ in the non-aqueous electrolyte was changed to 5.0 mass %.

[Evaluation of Batteries]

The batteries of the above Examples and Comparative Examples were evaluated for the following property.
<Low-Temperature Pulse Voltage After High-Temperature Storage>
[Evaluation 1]

The batteries were stored for 2000 hours in a 105° C. environment, and every after a predetermined time, each example battery was transferred into a −40° C. environment and left to stand for 3 hours. After the battery surface temperature cooled −40° C., a pulse voltage (V) (closed circuit voltage (CCV): voltage after 200 ms discharge at 10 mA) was measured. The measurement results are summarized in FIGS. 2 and 3.

Figure 2:
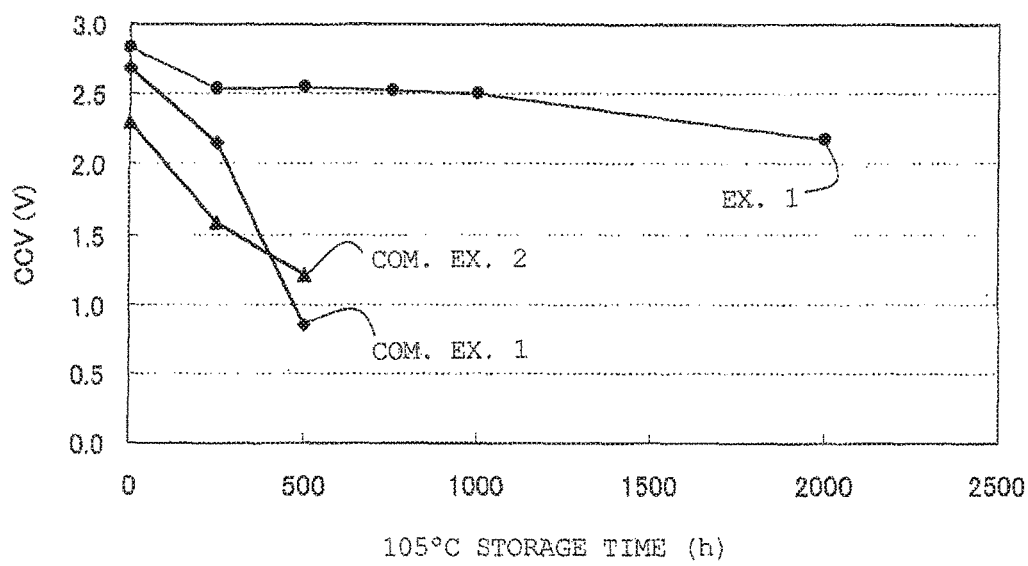
FIG. 2 A graph showing the relationship between the storage time at a high temperature (105° C.) and the pulse voltage (8 mA-200 ms discharge) at a low temperature of coin lithium batteries according to Example 1 and Comparative Examples 1 and 2.
Figure 3:
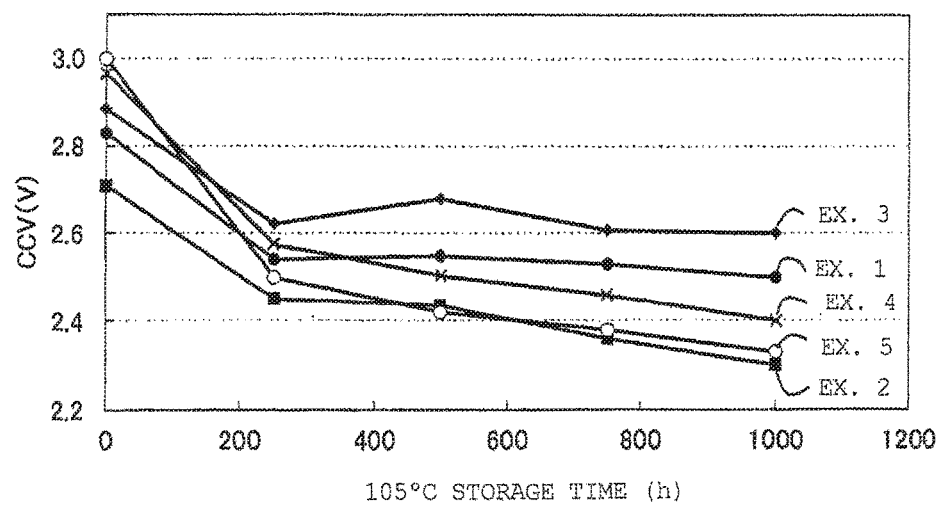
FIG. 3 A graph showing the relationship between the storage time at a high temperature (105° C.) and the pulse voltage (8 mA-200 ms discharge) at a low temperature of coin lithium batteries according to Examples 1 to 5.

As shown in FIG. 2, in Example 1 including $LiBF_4$ in the non-aqueous electrolyte and having a carbon material/matrix material composite bonded on the surface of the negative electrode (the surface facing the positive electrode), the low-temperature pulse characteristic significantly improved as compared with Comparative Examples 1 and 2. As shown in FIG. 3, Examples 1, 3 and 4 including $LiBF_4$ in a proportion of 2 to 4 mass % in the non-aqueous electrolyte were particularly excellent in low-temperature pulse characteristics.

In Comparative Example 1 having a carbon material/matrix material composite bonded on the surface of the negative electrode but not including $LiBF_4$ in the non-aqueous electrolyte, after high temperature storage for 500 hours, the pulse discharge characteristic deteriorated as compared with Comparative Example 2 not including $LiBF_4$ in the non-aqueous electrolyte and not having a carbon material/matrix, material composite bonded on the surface of the negative electrode. This is presumably because of a, depletion of non-aqueous electrolyte due to decomposition reactions or an, increase in internal resistance.

Comparative Example 3

A coin lithium battery (Battery D1) was fabricated in the same manner as Battery A1, except that the carbon material/matrix material composite was not bonded on the surface of the negative electrode (the surface facing the positive electrode).

Comparative Example 4

A coin lithium battery (Battery D2) was fabricated in the same manner as Battery D1, except that the proportion of $LiBF_4$ in the non-aqueous electrolyte was changed to 3.0 mass %.

Comparative Example 5

A coin lithium battery (Battery D3) was fabricated in the same manner as Battery D1, except that the proportion of $LiBF_4$ in the non-aqueous electrolyte was changed to 4.0 mass %.

The batteries of Comparative Examples 2 to 5 were evaluated for the following property.
<Low-Temperature Pulse Voltage After High-Temperature Storage>
[Evaluation 2]

The batteries were stored for 1000 hours in a 100° C. environment, and every after a predetermined time, each example battery was transferred into a −40° C. environment and left to stand for 3 hours. After the battery surface temperature cooled to −40° C., a pulse voltage (V) (CCV: voltage after 200 ms discharge at 8 mA) was measured. The measurement results are summarized in FIG. 4.

Figure 4:
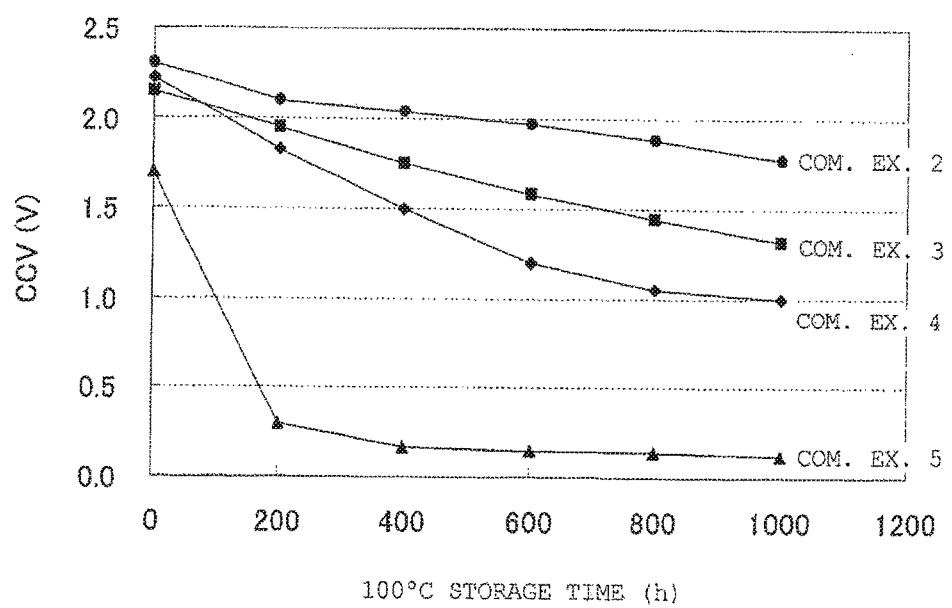
FIG. 4 A graph showing the relationship between the storage time at a high temperature (100° C.) and the pulse voltage (8 mA-200 ms discharge) at a low temperature of coin lithium batteries according to Comparative Examples 2 to 5.

As shown in FIG. 4, in Comparative Examples 3 to 5 including $LiBF_4$ in the non-aqueous electrolyte but not having a carbon material/matrix material composite bonded on the surface of the negative electrode, the low-temperature pulse characteristics were deteriorated as compared with Comparative Example 2. The deterioration in the low-temperature pulse characteristic was more significant with increase of the amount of the additive. This is presumably because the additive-involving side reaction (e.g. the reaction to produce lithium fluoride) caused a significant increase in internal resistance.

The foregoing indicates that merely adding LiBF$_4$ or merely allowing a carbon material to adhere to the surface of the negative electrode cannot improve the low-temperature pulse characteristics. By adding LiBF$_4$ in the non-aqueous electrolyte and allowing a carbon material to adhere to the surface of the negative electrode, the low-temperature pulse characteristics can be significantly improved, and the performance can be maintained even after storage for as long as 2000 hours under severe conditions.

Example 6

A coin lithium battery (A6) was fabricated in the same manner as Battery A1, except that a positive electrode including fluorinated graphite as the positive electrode active material was used.

The positive electrode was prepared in the following manner.

First, a fluorinated graphite (CF$_{1.05}$) serving as a positive electrode active material was prepared by fluorinating petroleum coke. The fluorinated graphite thus prepared, acetylene black serving as a conductive material, and styrene-butadiene rubber (SBR) serving as a binder were mixed in a mass ratio of 100:15:6. To the resultant mixture, water and isopropyl alcohol were added and well kneaded, to give a positive electrode material mixture. The positive electrode material mixture was dried at 100° C. and compacted into a disc-shaped pellet of 15 mm in diameter and 3.0 mm in thickness. Thereafter, the pellet was dried at 100° C. for 24 hours, and used as the positive electrode.

<Low-Temperature Pulse Voltage after High-Temperature Storage>

[Evaluation 3]

The low-temperature pulse characteristic of Battery A6 after storage at 105° C. for 1000 hours was measured under the same conditions as in Evaluation 1, and the result was that the CCV after 200 ms discharge at 8 mA was 2.1 V. The foregoing indicates that Battery A6 including fluorinated graphite as the positive active material, like Battery A1 including manganese dioxide, is excellent in low-temperature pulse characteristics after high-temperature storage.

It should be noted that when the proportion of LiBF$_4$ in the non-aqueous electrolyte is varied within the range of to 1 mass % (i.e., the ratio of LiBF$_4$ relative to 100 parts by mass of the solute (LiClO$_4$) is varied within the range of 2.1 to 21.4 parts by mass), satisfactory effects can be obtained, although not so much as in Example 5.

Likewise, when the amount of the carbon material (acetylene black) allowed to adhere to the surface of the negative electrode facing the positive electrode is varied within the range of 0.02 to 10.0 mg/cm$^2$, favorable effects similar to those in Examples 1 to 6 can be obtained.

Although an embodiment of a coin lithium battery (primary battery) was described as an example, the present invention is not limited to this embodiment. The present invention can be applied to various types of embodiments, such as a cylindrical battery and a prismatic battery. By using a lithium alloy, which has a high reversibility, as the negative electrode, the present invention can be applied to a lithium ion secondary battery.

INDUSTRIAL APPLICABILITY

The lithium battery of the present invention is suitably applicable when used for driving a device in a wide temperature range, for example, from −40° C. to 105° C. The lithium battery of the present invention can be applied to, for example, Tire-Pressure Monitoring (Management) System (TPMS).

REFERENCE SIGNS LIST

1: Battery case (Positive terminal), 2: Sealing plate (Negative terminal), 3: Positive electrode, 4: Negative electrode, 5: Separator, 6: Gasket, 10: Lithium battery

The invention claimed is:
1. A lithium primary battery comprising a positive electrode, a negative electrode containing lithium, and a non-aqueous electrolyte having lithium ion conductivity, wherein
the positive electrode includes at least one selected from the group consisting of a manganese oxide and a fluorinated graphite,
a powdery or fibrous carbon material adheres to at least part of a surface of the negative electrode, the surface facing the positive electrode,
the non-aqueous electrolyte includes a non-aqueous solvent, a solute, and an additive,
the solute includes LiClO$_4$,
the additive is LiBF$_4$, and
the non-aqueous electrolyte contains LiBF$_4$ in a proportion of 2 to 4 mass %.

2. The lithium primary battery of claim 1, wherein a ratio of LiBF$_4$ is 1 to 100 parts by mass, relative to 100 parts by mass of the solute.

3. The lithium primary battery of claim 1, wherein the non-aqueous solvent includes a cyclic carbonic acid ester and a chain ether.

4. The lithium primary battery of claim 3, wherein
the cyclic carbonic acid ester includes propylene carbonate,
the chain ether includes dimethoxymethane, and
the non-aqueous electrolyte contains propylene carbonate and dimethoxymethane in a proportion of 40 to 98 mass %.

5. The lithium primary battery of claim 1, wherein the positive electrode and the negative electrode are both in a disc shape.

* * * * *